United States Patent
Yoshimura

(10) Patent No.: US 9,256,179 B1
(45) Date of Patent: Feb. 9, 2016

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventor: Tomokazu Yoshimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/604,893

(22) Filed: Jan. 26, 2015

(30) Foreign Application Priority Data

Sep. 17, 2014 (JP) ................. 2014-189283

(51) Int. Cl.
*G03G 15/00* (2006.01)
*G06F 3/12* (2006.01)

(52) U.S. Cl.
CPC ........ *G03G 15/5016* (2013.01); *G03G 15/5075* (2013.01); *G06F 3/1261* (2013.01)

(58) Field of Classification Search
CPC .......... G03G 15/5016; G03G 15/5075; G03G 15/5095; G06F 3/126; G06F 3/1261; G06F 3/1226; G06F 3/1285; H04N 1/00477; H04N 2201/0072
USPC ...................... 399/81, 8, 9, 12; 358/1.14, 1.15
See application file for complete search history.

(56) References Cited

U.S. PATENT DOCUMENTS

| | | | |
|---|---|---|---|
| 6,738,587 B1 * | 5/2004 | Hoene et al. | 358/1.14 X |
| 8,662,768 B2 | 3/2014 | Hayashi | |
| 2007/0086052 A1 * | 4/2007 | Furuya | 358/1.15 |
| 2009/0273808 A1 * | 11/2009 | Kohli et al. | 358/1.15 |
| 2012/0212771 A1 * | 8/2012 | Goddard et al. | 358/1.15 |

FOREIGN PATENT DOCUMENTS

JP 2008-162043 A 7/2008
JP 2013-028051 A 2/2013

* cited by examiner

*Primary Examiner* — Sophia S Chen
(74) *Attorney, Agent, or Firm* — Sughrue Mion, PLLC

(57) ABSTRACT

An image forming apparatus includes an image forming unit and a display processing unit. The image forming unit forms an image on a recording medium. The display processing unit causes a display to display a group of options including a first option and a second option in a case where the image forming unit is not equipped with a function to form an image on a recording medium under specified image forming conditions, the first option being an option for issuing a command to form an image on a recording medium in a manner realized through a function of the image forming unit, the second option being an option for issuing a command to display identification information of an alternative apparatus equipped with a function to form an image on a recording medium under the image forming conditions among plural other connected image forming apparatuses.

14 Claims, 10 Drawing Sheets

| DEVICE ID | RECORDING SHEET SIZE | COLOR PRINTING FUNCTION | DOUBLE-SIDED PRINTING FUNCTION |
|---|---|---|---|
| DEVICE A | A3, A4 | FULL COLOR | YES (BOTH SIDES) |
| DEVICE B | A3, A4 | BLACK AND WHITE | YES (BOTH SIDES) |
| DEVICE C | A4 | FULL COLOR | NO (SINGLE SIDE) |
| DEVICE D | . . . | . . . | . . . |
| DEVICE E | . . . | . . . | . . . |
| . . . | . . . | . . . | . . . |
| . . . | . . . | . . . | . . . |
| DEVICE P | . . . | . . . | . . . |

| | DEVICE A | DEVICE B | DEVICE C |
|---|---|---|---|
| RECORDING SHEET SIZE | A3 | A3 | A4 |
| COLOR PRINTING FUNCTION | FULL COLOR | BLACK AND WHITE | FULL COLOR |
| IMAGE DATA | | | |
| (DOCUMENT AAA) A3/FULL COLOR | ○ | ⚠ | ⚠ |
| (DOCUMENT BBB) A3/BLACK AND WHITE | ○ | ○ | ⚠ |
| (DOCUMENT CCC) A4/FULL COLOR | ○ | ⚠ | ○ |
| (DOCUMENT DDD) A4/BLACK AND WHITE | ○ | ○ | ○ |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-189283 filed Sep. 17, 2014.

BACKGROUND 1. (i) Technical Field

The present invention relates to an image forming apparatus, an image forming method, and a non-transitory computer readable medium.

2. (ii) Related Art

A system is known that performs printing by interfacing between plural image forming apparatuses. Each image forming apparatus is equipped with a function to access another image forming apparatus, to acquire image data from the other image forming apparatus, and to print images represented by the image data.

In a system in which each image forming apparatus accesses another image forming apparatus, acquires image data from the other image forming apparatus, and prints images represented by the image data, there may be the case where an image forming apparatus that actually executes printing is not equipped with a function to perform printing under specified printing conditions. For example, even when printing conditions such as a print size, color printing or double-sided printing, and the like are specified, there may be the case where a certain image forming apparatus that actually executes printing is not equipped with a function to perform printing under these printing conditions. In order to cope with this case, it is conceivable that printing conditions (for example, a print size) are forcibly changed and printing is executed. However, when printing conditions are forcibly changed, a printed material may be formed that a user does not intend to obtain.

SUMMARY

According to an aspect of the invention, there is provided an image forming apparatus including an image forming unit and a display processing unit. The image forming unit forms an image on a recording medium. The display processing unit causes a display to display a group of options including a first option and a second option in a case where the image forming unit is not equipped with a function to form an image on a recording medium under specified image forming conditions, the first option being an option for issuing a command to form an image on a recording medium in a manner realized through a function of the image forming unit, the second option being an option for issuing a command to display identification information of an alternative apparatus equipped with a function to form an image on a recording medium under the image forming conditions among plural other connected image forming apparatuses.

BRIEF DESCRIPTION OF THE DRAWINGS

An exemplary embodiment of the present invention will be described in detail based on the following figures, wherein.

DETAILED DESCRIPTION

Figure 1:
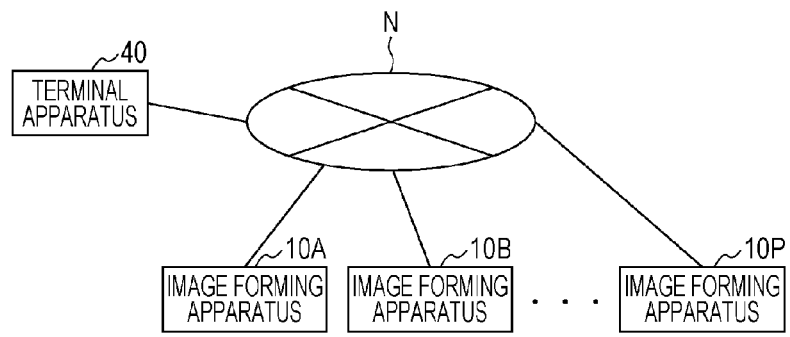
FIG. 1 is a block diagram illustrating an image forming system according to an exemplary embodiment of the present invention.

FIG. 1 illustrates an example of an image forming system according to an exemplary embodiment of the present invention. The image forming system includes plural image forming apparatuses (for example, image forming apparatuses 10A to 10P). Note that in the case where the image forming apparatuses 10A, 10B, . . . , and 10P do not have to be distinguished from one another, these are called "image forming apparatuses 10". The plural image forming apparatuses 10 are connected to a communication path N such as a network or the like. In the example illustrated in FIG. 1, 16 image forming apparatuses 10 are included in the image forming system. This is a mere example, and plural image forming apparatuses 10 other than 16 image forming apparatuses 10 may also be included in the image forming system. In addition, a terminal apparatus 40 is connected to the communication path N. Plural terminal apparatuses 40 may also be connected to the communication path N.

The image forming apparatuses 10 are, for example, electrophotographic printers. As a matter of course, the image forming apparatuses 10 may be printers other than electrophotographic printers. In addition, the image forming apparatuses 10 may also be equipped with at least one of a copy function, a scan function, and a facsimile function.

The terminal apparatus 40 is equipped with a function to transmit print data to the image forming apparatuses 10. The image forming apparatuses 10 are equipped with a function to store print data transmitted from the terminal apparatus 40.

Print data includes image data representing images to be printed and information associated with the image data (hereinafter simply referred to as associated information). Examples of associated information include image identification information for identifying image data (for example, an image data ID), information indicating a creation date of the image data, user identification information for identifying a user by whom the image data is stored (for example, a user ID), printing condition information, and the like. Furthermore, the examples of the associated information may also include information indicating the size of the image data and information indicating a data format of the image data.

Printing condition information is information indicating printing conditions set for image data. Examples of printing condition information include sheet information, color printing information, and layout information. Sheet information is information indicating size conditions set for recording mediums (for example, recording sheets) and is information indicating the size of recording sheets to be used to print images represented by image data. Examples of the size of recording sheets include an A3 size (JIS, A series, No. 3), an A4 size (JIS, A series, No. 4), a B5 size (JIS, B series, No. 5), and the like. Color printing information is information indicating color printing conditions at the time of printing, and is, for example, information indicating full-color printing or black-and-white printing. In full-color printing, for example, four color toners, which are cyan (C), magenta (M), yellow (Y), and black (K), are used to perform printing. As a matter of course, toners of colors other than the four colors may also be used. In black-and-white printing, for example, black (K) toner is used to perform printing. Layout information is information indicating layout conditions set for printing. Examples of a print layout include double-sided printing, single-sided printing, and the like. Printing conditions may also be set on a page-by-page basis for pages represented by image data. For example, different recording sheet sizes, different color printing conditions, and different layout conditions may also be set for pages on a page-by-page basis. That is, in the same image data, plural different printing conditions may be present. In this case, printing condition information indicates printing conditions set for each page.

Figure 2:
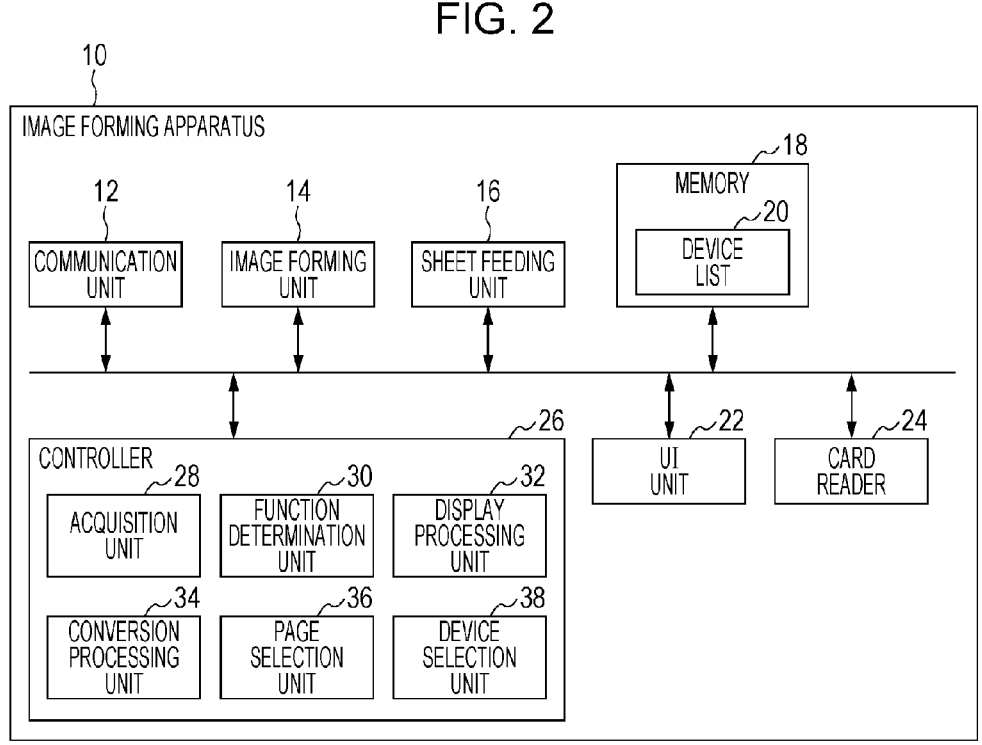
FIG. 2 is a block diagram illustrating an image forming apparatus.

FIG. 2 illustrates the configuration of a certain image forming apparatus 10.

A communication unit 12 is a communication interface connected to the communication path N. The communication unit 12 is equipped with a function to receive data from other apparatuses and a function to transmit data to other apparatuses.

An image forming unit 14 forms images corresponding to image data on recording mediums such as recording sheets or the like. As a result, images represented by the image data are printed on recording sheets. The image forming unit 14 prints images represented by image data, for example, on a page-by-page basis. The image forming unit 14 is equipped with a function to perform printing on recording sheets of a specific size. For example, the image forming unit 14 is equipped with a function to perform both printing on A3-size recording sheets and printing on A4-size recording sheets or is equipped with a function to perform printing only on A4-size recording sheets. As a matter of course, the image forming unit 14 may also be equipped with a function to perform printing on recording sheets of another size (for example, a B5 size or the like). In the following, the function to perform both printing on A3-size recording sheets and printing on A4-size recording sheets is called an "A3-size printing function". The function to perform printing only on A4-size recording sheets is called an "A4-size printing function".

In addition, the image forming unit 14 is equipped with either a full-color printing function or a black-and-white printing function. The image forming unit 14 equipped with the full-color printing function has both a function to perform full-color printing and a function to perform black-and-white printing. The image forming unit 14 equipped with the black-and-white printing function has a function to perform only black-and-white printing.

In addition, the image forming unit 14 is equipped with a double-sided printing function or a single-sided printing function. The image forming unit 14 equipped with the double-sided printing function has both a function to perform printing on both sides of recording sheets and a function to perform printing on single sides of recording sheets. The image forming unit 14 equipped with the single-sided printing function has a function to perform printing only on single sides of recording sheets.

In addition, the image forming unit 14 is equipped with a function to perform scaling printing. Scaling printing is a process in which an image is reduced or enlarged and then formed on a recording sheet.

Suppose that the image forming apparatuses 10A to 10P include apparatuses equipped with respective printing functions, which are different from one another. As a matter of course, the image forming apparatuses 10A to 10P may include plural apparatuses equipped with the same printing function. For example, in terms of recording sheet size, some apparatuses are equipped with the A3-size printing function and some apparatuses are equipped with the A4-size printing function among the image forming apparatuses 10A to 10P. In addition, in terms of color printing function, some apparatuses are equipped with the full-color printing function and some apparatuses are equipped with the black-and-white printing function. In addition, in terms of recording sheet layout, some apparatuses are equipped with the double-sided printing function and some apparatuses are equipped with the single-sided printing function.

A sheet feeding unit 16 feeds recording sheets to the image forming unit 14. The sheet feeding unit 16 is provided with one or plural sheet feeding cassettes. Each sheet feeding cassette holds recording sheets. In the case where plural sheet feeding cassettes are used, for example, the sheet feeding cassettes hold recording sheets of respective sizes, which are different from one another. For example, a first sheet feeding cassette holds A3-size recording sheets, and a second sheet feeding cassette holds A4-size recording sheets. For each sheet feeding cassette, the size of recording sheets loaded in the sheet feeding cassette is predetermined and information indicating the size is stored in a memory 18. Note that the sheet feeding unit 16 may also be provided with a manual feeding tray. Information on the size of recording sheets loaded on the manual feeding tray is also stored in the memory 18. Note that, as recording sheets, sheets only one side of each of which is blank may also be used. In this case, printing is performed on the blank side of each of such sheets. In the case where such sheets are used, information indicating that recording sheets loaded in a certain sheet feeding cassette or on the manual feeding tray are sheets only one side of each of which is blank is stored in the memory 18.

The memory 18 is a storage device such as a hard disk or the like. Print data transmitted from the terminal apparatus 40, authentication information for authenticating a user, and information on recording sheets loaded in the sheet feeding cassettes (size information, information as to whether or not sheets in a certain sheet feeding cassette are sheets only one side of each of which is blank, and the like) are stored in the memory 18. Authentication information includes, for example, user identification information and PIN information. PIN information is information used to verify that a certain user is an authenticated user. An example of the PIN information is a password.

In addition, a device list 20 is stored in the memory 18. The device list 20 is information indicating all the image forming apparatuses 10 included in the image forming system. The device list 20 includes device identification information for identifying the image forming apparatuses 10 from one another and printing function information indicating printing functions of the image forming apparatuses 10 (the image forming units 14). Printing function information indicates, for example, the size of recording sheets, the presence or absence of the full-color printing function, and the presence or absence of the double-sided printing function. Note that the device list 20 may also be stored in an apparatus such as a server or the like. In this case, the device list 20 does not have to be stored in the image forming apparatuses 10. The device list 20 will be described later in greater detail.

A user interface unit (UI unit) 22 includes an operation unit and a display. The operation unit is an input device such as an operation panel or the like. The display is a display device such as a liquid crystal display or the like.

A card reader 24 is equipped with a function to read information stored in authentication cards (for example, integrated circuit (IC) cards). For example, the user identification information and the PIN information included in the authentication information are stored in an authentication card. Authentication cards have been given to users in advance for user authentication. Note that user identification information and PIN information may also be input using the operation unit.

A controller 26 controls operations of units of the image forming apparatus 10 that includes the controller 26. For example, when print data is transmitted from the terminal apparatus 40, the controller 26 stores the print data in the memory 18.

In addition, the controller 26 includes an acquisition unit 28, a function determination unit 30, a display processing unit 32, a conversion processing unit 34, a page selection unit 36, and a device selection unit 38.

The acquisition unit 28 accesses image forming apparatuses 10 included in the device list 20, with reference to the device list 20. Then, the acquisition unit 28 acquires associated information included in print data from the image forming apparatuses 10 that the acquisition unit 28 is accessing. For example, when user identification information is input from the operation unit of the UI unit 22 or the card reader 24, the acquisition unit 28 acquires associated information including the user identification information from the image forming apparatuses 10 that the acquisition unit 28 is accessing. The display processing unit 32 causes the display of the UI unit 22 to display the associated information. For example, the display processing unit 32 causes the display to display the associated information in a list. When a user selects a piece of associated-information data from the list, the acquisition unit 28 acquires image data corresponding to the piece of associated-information data selected by the user from a certain image forming apparatus 10 that stores the image data. Then, the image forming unit 14 forms images corresponding to the acquired image data on recording sheets. In the case where the acquisition unit 28 accesses the image forming apparatus 10 that includes the acquisition unit 28 itself (such an image forming apparatus 10 is hereinafter referred to as a subject apparatus), the acquisition unit 28 accesses the memory 18 of the image forming apparatus 10 that includes the acquisition unit 28 itself and acquires associated information or image data.

The function determination unit 30 determines whether or not the image forming unit 14 of the subject apparatus is equipped with a certain printing function that satisfies specified printing conditions with reference to printing condition information included in the associated information acquired by the acquisition unit 28. That is, the function determination unit 30 determines whether or not printing may be realized under the specified printing conditions using the printing function of the image forming unit 14 of the subject apparatus. In the exemplary embodiment, this determination is made on a page-by-page basis. That is, the function determination unit 30 determines for each page whether or not printing may be realized under certain printing conditions set for the page using the printing function of the image forming unit 14 of the subject apparatus. For example, in the case where the image forming unit 14 of the subject apparatus is not equipped with the A3-size printing function and where an A3 size is specified as a printing condition, it is determined that, depending on the printing function of the image forming unit 14 of the subject apparatus, printing is not realized under the printing condition. That is, it is determined that the image forming unit 14 is not equipped with a certain printing function that satisfies the printing condition. In addition, in the case where the image forming unit 14 of the subject apparatus is not equipped with the full-color printing function and where full-color printing is specified as a printing condition, it is determined that, depending on the printing function of the image forming unit 14 of the subject apparatus, printing is not realized under the printing condition. In addition, in the case where the image forming unit 14 of the subject apparatus is not equipped with the double-sided printing function and where double-sided printing is specified as a printing condition, it is determined that, depending on the printing function of the image forming unit 14 of the subject apparatus, printing is not realized under the printing condition.

The display processing unit 32 causes the display of the UI unit 22 to display various types of information. For example, the display processing unit 32 causes the display to display, in a list, the associated information acquired by the acquisition unit 28.

In addition, the display processing unit 32 causes the display of the UI unit 22 to display warning information in accordance with a determination result of the function determination unit 30. Examples of warning information include graphic form information such as a warning mark and character information. In the case where it is determined that printing is not realized under certain printing conditions by the image forming unit 14 of the subject apparatus, that is, in the case where it is determined that the image forming unit 14 of the subject apparatus is not equipped with a certain function to perform printing under a printing condition among the certain printing conditions, the display processing unit 32 causes the display to display warning information on the printing condition. For example, the display processing unit 32 causes the display to display information on the printing condition, and causes the display to display warning information in association with the information on the printing condition. In the exemplary embodiment, in the case where there is a page for which printing is not realized under a certain printing condition among plural pages, the display processing unit 32 causes the display to display warning information.

In addition, the display processing unit 32 causes the display of the UI unit 22 to display option information. The option information is information indicating an alternative process for image data for which printing is not realized under certain printing conditions. Examples of an alternative process include a print size change, change from full-color printing to black-and-white printing, change from double-sided printing to single-sided printing, printing of only pages for which printing is realized under certain printing conditions through the printing function of the image forming unit 14 of the subject apparatus, display of device identification information of other image forming apparatuses 10 (alternative apparatuses) equipped with a function to perform printing under certain printing conditions, and the like. Warning information and option information will be described later in greater detail.

The conversion processing unit 34 is equipped with a function to reduce or enlarge the print size of images represented by image data. In the exemplary embodiment, the conversion processing unit 34 converts the print size of pages for which printing on recording sheets of a specified size is not realized into the size of recording sheets on which printing is realized through a printing function of the image forming unit 14 of the subject apparatus.

The page selection unit 36 selects pages for which printing is realized by the image forming unit 14 of the subject apparatus under specified printing conditions from among plural pages represented by image data with reference to printing condition information included in the associated information acquired by the acquisition unit 28.

The device selection unit 38 selects other image forming apparatuses 10 equipped with a function to perform printing under specified printing conditions with reference to the printing condition information included in the associated information acquired by the acquisition unit 28 and the device list 20.

As an example, the image forming apparatuses 10 are realized by hardware resources and software, which co-operate with each other. Specifically, the image forming apparatuses 10 include a processor such as a central processing unit (CPU) or the like, which is not illustrated. The processor reads programs stored in a memory device, not illustrated, and executes the programs. As a result, the functions of units of each image forming apparatus 10 are realized. The programs are stored in the memory device via a recording medium such as a CD, a DVD, or the like, or via a communication path such as a network or the like. Alternatively, the units of the image forming apparatus 10 may also be realized by hardware resources such as a processor, an electronic circuit, and the like. For the realization, a device such as a memory or the like may also be used.

Figures 3, 4:
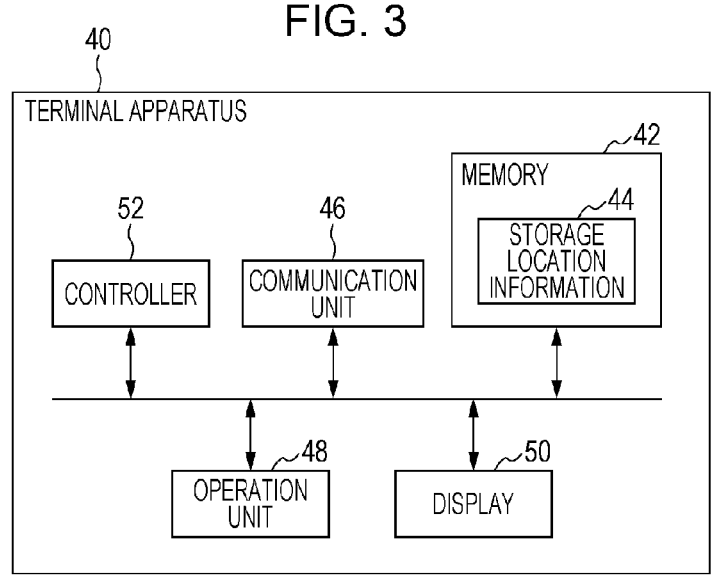
FIG. 3 is a block diagram illustrating a terminal apparatus.
FIG. 4 is a diagram illustrating an example of a device list.

FIG. 3 illustrates the configuration of the terminal apparatus 40. A memory 42 is a storage device such as a hard disk or the like. Storage location information 44 is stored in the memory 42. In addition, a printer driver is stored in the memory 42. The printer driver is a program having a function to control an image forming apparatus 10. The storage location information 44 is information indicating an image forming apparatus 10 in which print data transmitted from the terminal apparatus 40 is to be stored. In the example of the image forming system illustrated in FIG. 1, the storage location information 44 is information indicating any one of the image forming apparatuses 10A to 10P. The storage location information 44 is, for example, device identification information of an image forming apparatus 10. As another example, the storage location information 44 may also be an Internet Protocol (IP) address assigned to an image forming apparatus 10. The storage location information 44 may be predetermined or may also be changed by a user.

A communication unit 46 is a communication interface connected to the communication path N. The communication unit 46 is equipped with a function to receive data from other apparatuses and a function to transmit data to other apparatuses. For example, the communication unit 46 is equipped with a function to transmit print data specified by a user to an image forming apparatus 10 indicated by the storage location information 44.

Examples of an operation unit 48 include input devices such as a keyboard, a mouse, and the like. A display 50 is a display device such as a liquid crystal display or the like. A controller 52 controls operations of units of the terminal apparatus 40 that includes the controller 52. For example, a user uses the operation unit 48 and specifies image data, which is a print target, and printing conditions.

As an example, the terminal apparatus 40 is realized by hardware resources and software, which co-operate with each other. Specifically, the terminal apparatus 40 includes a processor such as a CPU or the like, which is not illustrated. The processor reads programs stored in a memory device, not illustrated, and executes the programs. As a result, the functions of units of the terminal apparatus 40 are realized. The programs are stored in the memory device via a recording medium such as a CD, a DVD, or the like, or via a communication path such as a network or the like. Alternatively, the units of the terminal apparatus 40 may also be realized by hardware resources such as a processor, an electronic circuit, and the like. For the realization, a device such as a memory or the like may also be used.

(Specific Example of Device List 20)

Next, with reference to FIG. 4, a specific example of the device list 20 will be described. The device list 20 is stored in the memory 18 of each of the image forming apparatuses 10.

The device list 20 includes device identification information (for example, device IDs) of all the image forming apparatuses 10 included in the image forming system (the image forming apparatuses 10A to 10P). For example, "device A" is a device ID of the image forming apparatus 10A. "Device B" is a device ID of the image forming apparatus 10B. "Device C" is a device ID of the image forming apparatus 10C. "Device D" is a device ID of the image forming apparatus 10D. "Device E" is a device ID of the image forming apparatus 10E. "Device P" is a device ID of the image forming apparatus 10P.

In addition, the device list 20 includes printing function information indicating printing functions of the image forming apparatuses 10A to 10P. For example, the device list 20 includes information indicating the size of recording sheets on which printing is realized through the printing function of the image forming unit 14, information indicating the presence or absence of a color printing function, and information indicating the presence or absence of the double-sided printing function.

In the example illustrated in FIG. 4, the image forming apparatus 10A (device A) is equipped with the A3-size printing function, the full-color printing function, and the double-sided printing function. In addition, the image forming apparatus 10B (device B) is equipped with the A3-size printing function, the black-and-white printing function, and the double-sided printing function. In addition, the image forming apparatus 10C (device C) is equipped with the A4-size printing function, the full-color printing function, and the single-sided printing function. The printing functions of the other image forming apparatuses 10 are also illustrated in the device list 20.

The device list 20 is created by, for example, an administrator. Note that the controller 26 of each image forming apparatus 10 may acquire device IDs and function information from other image forming apparatuses 10 and create the device list 20. In addition, in the case where an image forming apparatus 10 is newly connected to the communication path N, the controller 26 of each image forming apparatus 10 may detect the newly connected image forming apparatus 10. In this case, the controller 26 may acquire a device ID and function information from the newly connected image forming apparatus 10 and add the device ID and the function information to the device list 20.

(Overview of Process in Image Forming System)

Here, an overview of a process performed by the image forming system will be described. First, a user specifies image data, which is a print target, and printing conditions using the operation unit 48 of the terminal apparatus 40, and issues a command to store the image data. The communication unit 46 transmits print data including image data and associated information to a certain image forming apparatus 10 indicated by the storage location information 44 under control of the controller 52. As an example, in the case where the storage location information 44 indicates the image forming apparatus 10C, print data is transmitted to the image forming apparatus 10C.

The communication unit 12 of the image forming apparatus 10C receives the print data transmitted from the terminal apparatus 40. Then, the controller 26 stores the print data in the memory 18.

After issuing the command to store the image data, the user moves to any one of the image forming apparatuses 10A to 10P. For example, the user may move to a certain image forming apparatus 10 that the user generally uses. If the certain image forming apparatus 10 is being used, the user may move to another image forming apparatus 10. Alternatively, the user may move to the image forming apparatus 10 closest to where the user is. Here, suppose that the user has moved to the image forming apparatus 10P illustrated in FIG. 1.

When the user inputs a user ID and PIN information to the image forming apparatus 10P, the acquisition unit 28 of the image forming apparatus 10P accesses the image forming apparatuses 10 included in the device list 20. Then, the acquisition unit 28 acquires associated information including the user ID from the image forming apparatuses 10, which are access targets. The controller 26 of the image forming apparatus 10P causes the display of the UI unit 22 to display, in a list, the associated information acquired by the acquisition unit 28. When the user selects a piece of associated-information data from the list, the acquisition unit 28 acquires image data corresponding to the selected piece of associated-information data from a certain image forming apparatus 10 that stores the image data. For example, in the case where image data stored in the image forming apparatus 10C is selected, the acquisition unit 28 acquires the selected image data from the image forming apparatus 10C. The image forming unit 14 forms images corresponding to the image data on sheets.

As described above, the image forming apparatuses 10 are equipped with a function to acquire image data stored in another image forming apparatus 10 and to form images. As a result, the user does not have to store image data in a certain image forming apparatus 10 by which printing is to be actually performed. As long as the image data is stored in any one of plural image forming apparatuses 10 included in the image forming system, printing is realized by any of the plural image forming apparatuses 10.

Figure 5:
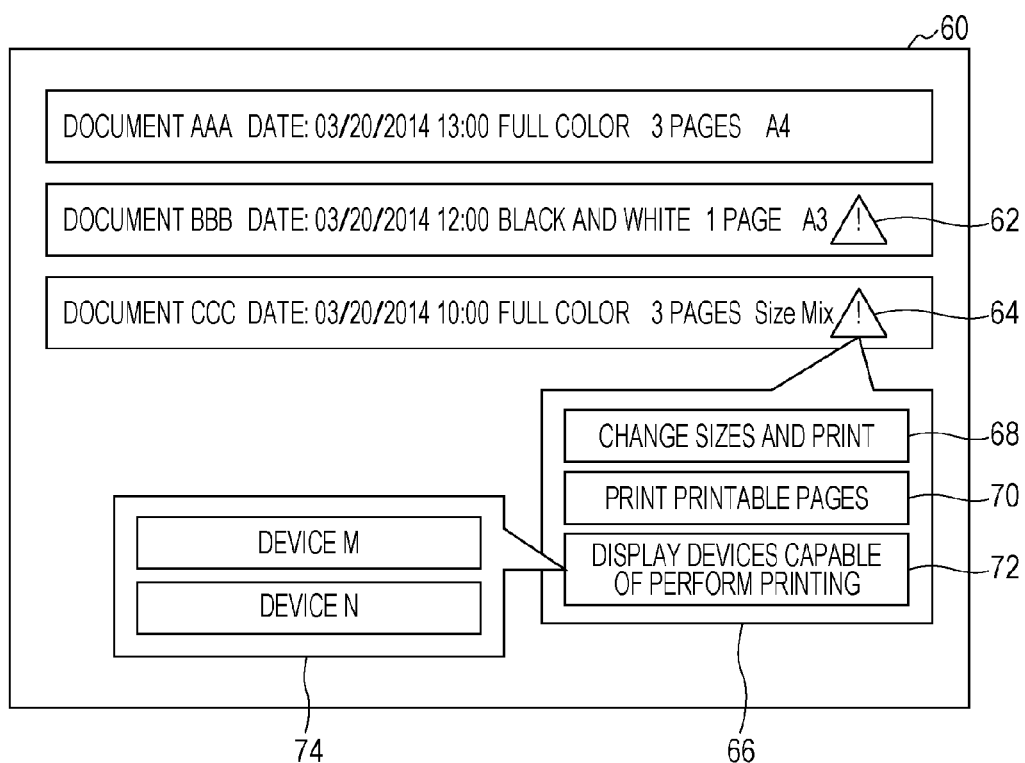
FIG. 5 is a diagram illustrating an example of a screen of a display.

FIG. 5 illustrates an example of display of associated information. In the case where printing is performed using the image forming apparatus 10P, associated information is displayed on the display of the UI unit 22 of the image forming apparatus 10P. A list of image data IDs (documents AAA, BBB, and CCC) is displayed on a screen 60 of the display. That is, associated information on image data of "document AAA", "document BBB", and "document CCC" is acquired by the acquisition unit 28 of the image forming apparatus 10P from the image forming apparatuses 10A to 10P.

In addition, printing conditions set for each image data (a color printing condition and a size condition) are displayed. For example, full-color printing is specified as a color printing condition for the image data of "document AAA". As a recording sheet size, an A4 size is specified. The number of pages is three.

As a color printing condition for the image data of "document BBB", black-and-white printing is specified. As a recording sheet size, an A3 size is specified. The number of pages is one.

As a color printing condition for the image data of "document CCC", full-color printing is specified. As recording sheet sizes, an A3 size and an A4 size are specified, and plural recording sheet sizes are specified. In FIG. 5, a notation "Size Mix" indicates that plural recording sheet sizes are specified. For the image data of "document CCC", different sizes are specified for pages on a page-by-page basis. That is, for each page, either an A3 size or an A4 size is specified. Since the number of pages is three, A3-size printing is specified for one or two of the three pages and A4-size printing is specified for the other pages.

Note that, in the example illustrated in FIG. 5, the image forming apparatus 10P is equipped with the A4-size printing function and the full-color printing function.

Warning marks 62 and 64 are displayed on the screen 60. The warning marks 62 and 64 are created by the display processing unit 32 of the image forming apparatus 10P and displayed on the display. The display processing unit 32 causes a warning mark to be displayed near a display position of information indicating a print condition under which printing is not realized by the subject apparatus (the image forming apparatus 10P). In the example illustrated in FIG. 5, the warning mark 62 is a mark for the image data of "document BBB". The warning mark 64 is a mark for the image data of "document CCC". The warning marks 62 and 64 are displayed near display positions of information indicating recording sheet sizes (A3 and Size Mix). This indicates that the image forming unit 14 of the subject apparatus is not equipped with a function to perform printing on A3-size recording sheets. That is, this indicates that the image data of "document BBB" and that of "document CCC" include image data for A3-size pages for which printing is not realized by the subject apparatus.

As described above, a warning mark is displayed near a display position of information indicating a print condition under which printing is not realized by the subject apparatus. As a result, the subject apparatus is in a state in which the user may recognize printing conditions under which printing is not realized by the subject apparatus. In the example illustrated in FIG. 5, the user may recognize that printing is not performed on A3-size recording sheets by the subject apparatus. In addition, the user may recognize image data for which an A3 size is specified as a recording sheet size and recognize that printing is not completed for the image data by the subject apparatus.

When the user specifies image data for which a warning mark is displayed or the warning mark using the operation unit of the UI unit 22, the display processing unit 32 causes the display to display option information. In the example illustrated in FIG. 5, the image data of "document CCC" or the warning mark 64 is specified, and an option field 66 for the image data of "document CCC" is displayed on the display. In the option field 66, options 68, 70, and 72 are displayed as option information. Since the image forming unit 14 of the subject apparatus is not equipped with a function to perform printing on recording sheets of a certain specified size, options regarding recording sheet sizes are displayed.

The option 68 is an option for issuing a command to perform a process in which the size of an image is changed and the resulting image is printed. When the process for the option 68 is executed, the print size of images represented by image data for A3 pages (pages for which printing on A3-size recording sheets has been specified) is reduced to the size corresponding to an A4 size. Then, the reduced images are printed on A4-size recording sheets. The print size is reduced by the conversion processing unit 34 of the image forming apparatus 10P and images having a reduced size are printed on A4-size recording sheets by the image forming unit 14 of the image forming apparatus 10P. The print size of images represented by image data for A4 pages (pages for which printing on A4-size recording sheets has been specified) is not changed. The size of images for A4 pages is maintained and the images are printed on recording sheets. That is, when the process for the option 68 is executed, images represented by the image data for all the pages are printed on recording sheets having a size of A4.

The option 70 is an option for issuing a command to perform a process in which only certain pages are printed, the certain pages being pages that may be printed by the subject apparatus. The pages that may be printed by the subject apparatus refer to pages for which printing is realized under specified printing conditions by the image forming unit 14 of the subject apparatus. In the example illustrated in FIG. 5, in the case where plural recording sheet sizes are specified and where plural pages include a page for which printing is realized under certain printing conditions through the printing function of the image forming unit 14 of the subject apparatus, the display processing unit 32 causes the display to display the option 70. That is, in the case where a size for which printing is realized (for example, an A4 size) and a size for which printing is not realized (for example, an A3 size) through the printing function of the image forming unit 14 of the subject apparatus are specified as recording sheet sizes, the option 70 is displayed on the display. In contrast, in the case where only the size for which printing is not realized (for example, an A3 size) is specified, the option 70 is not displayed. When the process for the option 70 is executed, only images for A4 pages are printed on A4-size recording sheets by the image forming unit 14 of the image forming apparatus 10P. In the exemplary embodiment, the page selection unit 36 of the image forming apparatus 10P selects A4 pages from among three pages represented by the image data of "document CCC". The image forming unit 14 prints only images for selected A4 pages on A4-size recording sheets.

The option 72 is an option for issuing a command to perform a process in which information on other image forming apparatuses 10 capable of perform printing (alternative apparatuses) is displayed. Here, an image forming apparatus 10 capable of perform printing refers to an image forming apparatus 10 equipped with a function to perform printing under specified printing conditions. In the example illustrated in FIG. 5, other image forming apparatuses 10 equipped with the A3-size printing function (image forming apparatuses 10 that support A3 and A4 sizes) correspond to image forming apparatuses 10 capable of perform printing. In the exemplary embodiment, the device selection unit 38 of the image forming apparatus 10P selects image forming apparatuses 10 equipped with the A3-size printing function with reference to the device list 20. Here, the image forming apparatuses 10M and 10N are selected. When the user selects the option 72, the display processing unit 32 causes the display to display a list 74 of device IDs of the image forming apparatuses 10 selected by the device selection unit 38. In the example illustrated in FIG. 5, the device IDs of the image forming apparatuses 10M and 10N (device M and device N) are displayed.

Note that, in FIG. 5, the warning mark 62 for the image data of "document BBB" is also displayed. For this image data, an A3 size is specified as a recording sheet size. That is, only the size for which printing is not realized by the image forming unit 14 of the image forming apparatus 10P is specified. In the case where the image data of "document BBB" or the warning mark 62 has been specified by the user, the options 68 and 72 are displayed. The image data of "document BBB" does not include image data for a page (an A4 page) that may be printed by the image forming apparatus 10P (the subject apparatus). Thus, the option 70 is not displayed.

Figure 6:
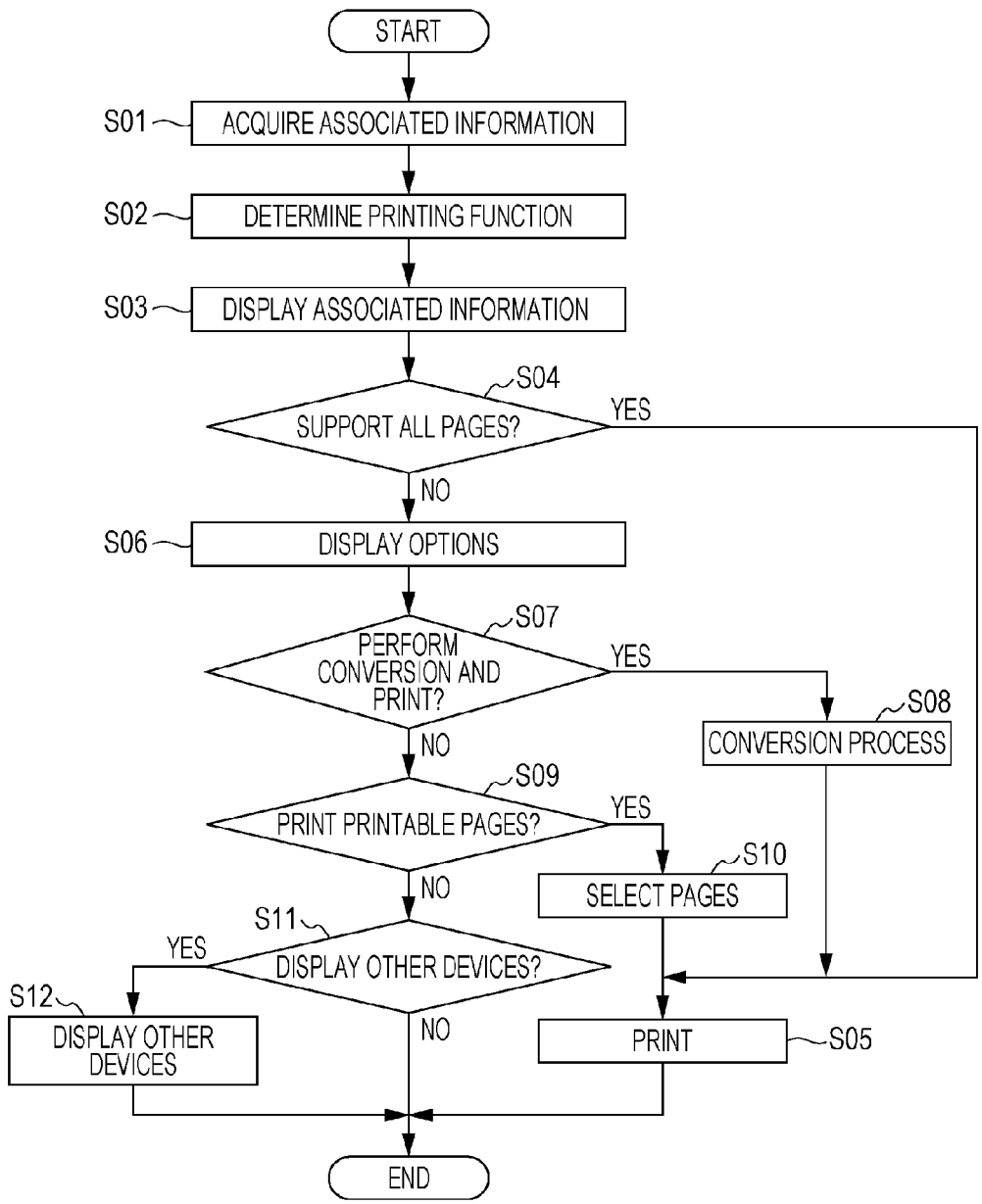
FIG. 6 is a flowchart illustrating an example of a process performed by the image forming apparatus.

Next, a process performed by an image forming apparatus 10 among the image forming apparatuses 10 will be described with reference to a flowchart illustrated in FIG. 6. Here, suppose that print data has already been transmitted from the terminal apparatus 40 to the image forming apparatus 10 and the print data has already been stored in the image forming apparatus 10. In addition, suppose that printing is to be performed using the image forming apparatus 10P.

First, when the user inputs an user ID and PIN information to the image forming apparatus 10P, the acquisition unit 28 of the image forming apparatus 10P acquires associated information including the user ID from the image forming apparatuses 10A to 10P (S01).

The function determination unit 30 determines, on a page-by-page basis, whether or not printing is realized under the printing conditions set for each page through the printing function of the image forming unit 14 of the subject apparatus with reference to pieces of associated-information data included in the associated information (S02).

The display processing unit 32 causes the display of the UI unit 22 to display, in a list, the associated information acquired by the acquisition unit 28 (S03). The display processing unit 32 causes the display to display a warning mark for image data for which printing is not realized under specified printing conditions by the subject apparatus. For example, as illustrated in FIG. 5, associated information and warning marks are displayed on the screen 60 of the display.

Then, the user selects image data as a print target from the list using the operation unit of the UI unit 22. Here, in the case where printing is realized for all the pages represented by the image data selected by the user under specified printing conditions (Yes in S04), that is, where the image forming unit 14 of the subject apparatus is equipped with a function to print all the pages under the specified printing conditions, the image forming unit 14 of the image forming apparatus 10P prints all the pages for the selected image data on recording sheets under the specified printing conditions (S05). In the example illustrated in FIG. 5, a warning mark is not displayed for the image data of "document AAA". That is, the image forming unit 14 of the image forming apparatus 10P is equipped with a function to print all the pages for the image data of "document AAA" under certain printing conditions. Thus, when the image data of "document AAA" is selected by the user as a print target, all the pages (three pages) for the image data of "document AAA" are printed on recording sheets by the image forming unit 14 of the image forming apparatus 10P. In this case, the image data of "document AAA" are printed in full color on A4-size recording sheets.

In contrast, for the image data selected by the user, in the case where there is a page for which printing is not realized under the specified printing conditions (No in S04), the display processing unit 32 causes the display to display option information for the selected image data (S06). To illustrate this by the example illustrated in FIG. 5, when the image data of "document CCC" or the warning mark 64 is specified by the user, the display processing unit 32 causes the display to display the option field 66 for the image data of "document CCC".

In the case where the option 68 has been selected by the user (Yes in S07), that is, where processing has been selected in which printing is performed after size change, the process proceeds to step S08. In step S08, the conversion processing unit 34 of the image forming apparatus 10P converts the print size of pages for which printing on recording sheets of a specified size is not realized by the subject apparatus into a size for which printing is realized by the subject apparatus. In the example illustrated in FIG. 5, the conversion processing unit 34 reduces the print size of images represented by image data for A3 pages to the size corresponding to an A4 size. Then, the image forming unit 14 prints all the pages for the image data of "document CCC" on A4-size recording sheets (S05). As a result, images for A4 pages are printed on A4-size recording sheets while the size of the images is being maintained. In addition, the size of images for A3 pages is reduced to the size corresponding to an A4 size, and then the reduced images are printed on A4-size recording sheets. For example, in the case where the user wants printing to be performed regardless of the size of recording sheets, the user has only to select the option 68. As a result, all the pages are printed. For example, in the case where the content of a printed document is to be checked, it is conceivable that the option 68 is selected.

In the case where the option 68 has not been selected by the user (No in S07) and where the option 70 has been selected (Yes in S09), that is, in the case where processing has been selected in which only pages that may be printed by the subject apparatus are printed, the process proceeds to step S10. In step S10, the page selection unit 36 of the image forming apparatus 10P selects pages for which printing is realized under the specified printing conditions by the subject apparatus from among plural pages. In the example illustrated in FIG. 5, the page selection unit 36 selects A4 pages from among three pages represented by the image data of "document CCC". Then, the image forming unit 14 prints only images for the A4 pages, on A4-size recording sheets (S05). For example, in the case where the user wants printing to be performed only for pages that may be printed by the subject apparatus, it is conceivable that the option 70 is selected.

In the case where the option 70 has not been selected by the user (No in S09) and where the option 72 has been selected (Yes in S11), that is, in the case where processing has been selected in which information on alternative apparatuses is displayed, the process proceeds to step S12. In step S12, the display processing unit 32 of the image forming apparatus 10P causes the display to display device IDs of other image forming apparatuses 10 equipped with a function to perform printing under the specified printing conditions. The other image forming apparatuses 10 are selected by the device selection unit 38 of the image forming apparatus 10P. That is, the device selection unit 38 of the image forming apparatus 10P selects other image forming apparatuses 10 equipped with a function to perform printing under the specified printing conditions, with reference to the device list 20. In the example illustrated in FIG. 5, the image forming apparatuses 10M and 10N equipped with the A3-size printing function are selected, and the device IDs (device M and device N) of the image forming apparatuses 10M and 10N are displayed. In the example illustrated in FIG. 5, the image forming apparatuses 10M and 10N may be recognized by the user. In this case, it is conceivable that the user prints, using either of the image forming apparatuses 10M and 10N, image data that is not printed by the image forming apparatus 10P. Note that, in the case where the option 72 is not selected (No in S11), the process ends. Alternatively, the process stops until the user selects an option from among the above-described options.

As described above, in the case where printing is not realized on recording sheets of a specified size through the printing function of the subject apparatus, option information indicating alternative processes is displayed.

Figure 7:
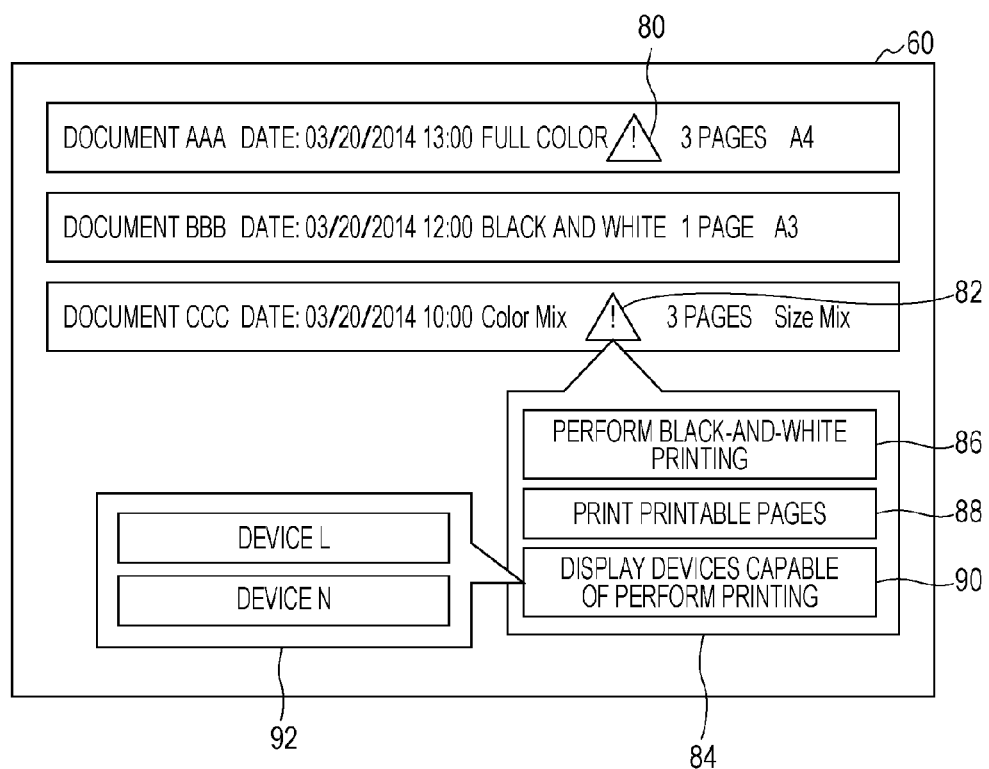
FIG. 7 is a diagram illustrating an example of a screen of the display.

Next, another example will be described with reference to FIG. 7. FIG. 7 illustrates an example of display of associated information. For example, in the case where printing is performed using the image forming apparatus 10P, associated information is displayed on the display of the UI unit 22 of the image forming apparatus 10P. Similarly to as in the example illustrated in FIG. 5, a list of image data IDs (documents AAA, BBB, and CCC) is displayed on the screen 60 of the display.

In addition, printing conditions set for each image data (a color printing condition and a size condition) are displayed. Printing conditions set for the image data of "document AAA" and that of "document BBB" are the same as those illustrated in FIG. 5. As color printing conditions set for the image data of "document CCC", full-color printing and black-and-white printing are specified, and plural color printing conditions are specified. In FIG. 7, a notation "Color Mix" indicates that plural color printing conditions are specified. For the image data of "document CCC", different color printing conditions are specified for pages on a page-by-page basis. That is, for each page, either full-color printing or black-and-white printing is specified. Since the number of pages is three, full-color printing is specified for one or two of the three pages and black-and-white printing is specified for the other pages.

Note that, in the example illustrated in FIG. 7, the image forming apparatus 10P is equipped with the A3-size printing function and the black-and-white printing function.

Warning marks 80 and 82 are displayed on the screen 60. The warning marks 80 and 82 are created by the display processing unit 32 of the image forming apparatus 10P and displayed on the display. The warning mark 80 is a mark for the image data of "document AAA". The warning mark 82 is a mark for the image data of "document CCC". The warning marks 80 and 82 are displayed near display positions of information indicating color printing conditions (Full Color and Color Mix). This indicates that the image forming unit 14 of the subject apparatus is not equipped with the full-color printing function. That is, this indicates that the image data of "document AAA" and that of "document CCC" include image data for full-color pages for which printing is not realized by the image forming unit 14 of the subject apparatus.

When the user specifies image data for which a warning mark is displayed or the warning mark using the operation unit of the UI unit 22, the display processing unit 32 causes the display to display option information. In the example illustrated in FIG. 7, the image data of "document CCC" or the warning mark 82 is specified, and an option field 84 for the image data of "document CCC" is displayed on the display. In the option field 84, options 86, 88, and 90 are displayed as option information. Since the image forming unit 14 of the subject apparatus is not equipped with a function to perform printing under specified color printing conditions, options regarding color printing conditions are displayed.

The option 86 is an option for issuing a command to perform black-and-white printing. When the process for the option 86 is executed, the image forming unit 14 of the image forming apparatus 10P prints images for full-color pages (pages for which full-color printing has been specified) on recording sheets in black and white. In addition, the image forming unit 14 prints images for black-and-white pages (pages for which black-and-white printing has been specified) on recording sheets in black and white. That is, when the process for the option 86 is executed, all the pages are printed in black and white.

The option 88 is an option for issuing a command to perform a process in which only certain pages are printed, the certain pages being pages that may be printed by the subject apparatus. In the example illustrated in FIG. 7, in the case where plural color printing conditions are specified and where plural pages include a page for which printing is realized under certain printing conditions through the printing function of the image forming unit 14 of the subject apparatus, the display processing unit 32 causes the display to display the option 88. That is, in the case where a color printing condition under which printing is realized (for example, black-and-white printing) and a color printing condition under which printing is not realized (for example, full-color printing) through the printing function of the image forming unit 14 of the subject apparatus are specified as color printing conditions, the option 88 is displayed on the display. In contrast, in the case where only the color printing condition under which printing is not realized (for example, full-color printing) is specified, the option 88 is not displayed. When the process for the option 88 is executed, only images for black-and-white pages are printed on recording sheets of a specified size by the image forming unit 14 of the image forming apparatus 10P. In the exemplary embodiment, the page selection unit 36 of the image forming apparatus 10P selects black-and-white pages from among the three pages represented by the image data of "document CCC". The image forming unit 14 prints only images for the selected black-and-white pages on recording sheets of a specified size.

The option 90 is an option for issuing a command to perform a process in which information on other image forming apparatuses 10 capable of perform printing is displayed. In the example illustrated in FIG. 7, other image forming apparatuses 10 equipped with the full-color printing function (image forming apparatuses 10 that support full color) correspond to image forming apparatuses 10 capable of perform printing. In the exemplary embodiment, the device selection unit 38 of the image forming apparatus 10P selects other image forming apparatuses 10 equipped with the full-color printing function with reference to the device list 20. Here, the image forming apparatuses 10L and 10N are selected. When the user selects the option 90, the display processing unit 32 causes the display to display a list 92 of device IDs of the image forming apparatuses 10 selected by the device selection unit 38. In the example illustrated in FIG. 7, the device IDs of the image forming apparatuses 10L and 10N (device L and device N) are displayed.

Note that, in FIG. 7, the warning mark 80 for the image data of "document AAA" is also displayed. For this image data, full-color printing is specified as a color printing condition. That is, only the color printing condition under which printing is not realized by the image forming unit 14 of the image forming apparatus 10P is specified. In the case where the image data of "document AAA" or the warning mark 80 has been specified by the user, the options 86 and 90 are displayed. The image data of "document AAA" does not include image data for a page (a black-and-white page) that may be printed by the image forming apparatus 10P (the subject apparatus). Thus, the option 88 is not displayed.

As described above, in the case where printing is not realized under specified color printing conditions through the printing function of the subject apparatus, option information indicating alternative processes is displayed.

Figure 8:
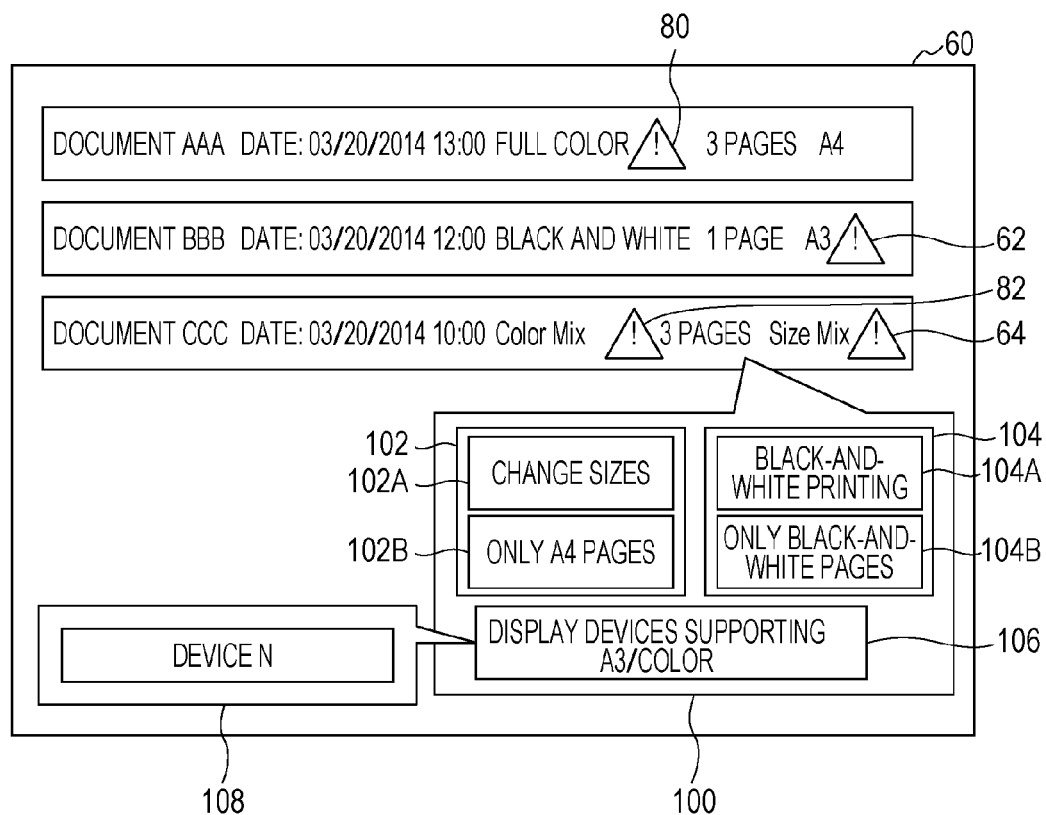
FIG. 8 is a diagram illustrating an example of a screen of the display.

Next, another example will be described with reference to FIG. 8. FIG. 8 illustrates an example of display of associated information. For example, in the case where printing is performed using the image forming apparatus 10P, associated information is displayed on the display of the UI unit 22 of the image forming apparatus 10P. Similarly to as in the example illustrated in FIG. 8, a list of image data IDs (documents AAA, BBB, and CCC) is displayed on the screen 60 of the display.

In addition, printing conditions set for each image data (a color printing condition and the size of recording sheets) are displayed. Printing conditions set for the image data of "document AAA" and that of "document BBB" are the same as those illustrated in FIGS. 5 and 7. Similarly to as in the example illustrated in FIG. 7, as color printing conditions set for the image data of "document CCC", full-color printing and black-and-white printing are specified, and plural color printing conditions are specified. In FIG. 8, a notation "Color Mix" indicates that plural color printing conditions are specified. That is, for each page, either full-color printing or black-and-white printing is specified. In addition, similarly to as in the example illustrated in FIG. 5, an A3 size and an A4 size are specified as recording sheet sizes for the image data of "document CCC", and plural recording sheet sizes are specified. In FIG. 8, "Size Mix" indicates that plural recording sheet sizes are specified. That is, for each page, either an A3 size or an A4 size is specified.

Note that, in the example illustrated in FIG. 8, the image forming apparatus 10P is equipped with the A4-size printing function and the black-and-white printing function.

The warning marks 62, 64, 80, and 82 are displayed on the screen 60. These warning marks are created by the display processing unit 32 of the image forming apparatus 10P and displayed on the display. In the example illustrated in FIG. 8, the warning mark 62 is a mark for the image data of "document BBB". The warning mark 64 is a mark for the image data of "document CCC". Similarly to as in the example illustrated in FIG. 5, the warning marks 62 and 64 are displayed near display positions of information indicating recording sheet sizes (A3 and Size Mix). This indicates that the image forming unit 14 of the subject apparatus is not equipped with the A3-size printing function. In addition, the warning mark 80 is a mark for the image data of "document AAA". The warning mark 82 is a mark for the image data of "document CCC". Similarly to as in the example illustrated in FIG. 7, the warning marks 80 and 82 are displayed near display positions of information indicating color printing conditions (Full Color and Color Mix). This indicates that the image forming unit 14 of the subject apparatus is not equipped with the full-color printing function.

In the example illustrated in FIG. 8, for the image data of "document CCC", the warning mark 64 regarding a recording sheet size and the warning mark 82 regarding a color printing condition are displayed. That is, for the image data of "document CCC", the recording sheet size and the color printing condition that are not realized through the printing function of the image forming unit 14 of the subject apparatus are specified as printing conditions.

When the user specifies image data for which a warning mark is displayed or the warning mark using the operation unit of the UI unit 22, the display processing unit 32 causes the display to display option information. In the example illustrated in FIG. 8, the image data of "document CCC" is specified, and an option field 100 for the image data of "document CCC" is displayed. In the option field 100, a size option 102, a color option 104, and an option 106 are displayed.

The size option 102 is an option regarding a recording sheet size, and includes options 102A and 102B. The option 102A is the same as the option 68 illustrated in FIG. 5, and the option 102B is the same as the option 70. That is, the option 102A is an option for issuing a command to perform a process in which the size of an image is changed and the resulting image is printed. The option 102B is an option for issuing a command to perform a process in which only certain pages are printed, the certain pages being pages (A4 pages) for which printing is realized under a certain size condition by the subject apparatus.

The color option 104 is an option regarding color printing conditions, and includes options 104A and 104B. The option 104A is the same as the option 86 illustrated in FIG. 7, and the option 104B is the same as the option 88. That is, the option 104A is an option for issuing a command to perform black-and-white printing. The option 104B is an option for issuing a command to perform a process in which only certain pages are printed, the certain pages being pages (black-and-white pages) for which printing is realized under a certain color printing condition by the subject apparatus. In this manner, for each of the printing conditions (size conditions and color printing conditions), a warning mark may be displayed. In addition, for each printing condition, options may be displayed.

The option 106 is an option for issuing a command to display information on other image forming apparatuses 10 equipped with the A3-size printing function and the full-color printing function. In the exemplary embodiment, the device selection unit 38 of the image forming apparatus 10p selects other image forming apparatuses 10 equipped with the A3-size printing function and the full-color printing function with reference to the device list 20. Here, the image forming apparatus 10N is selected. When the user selects the option 106, the display processing unit 32 causes the display to display a list 108 of device IDs of the image forming apparatuses 10 selected by the device selection unit 38. In the example illustrated in FIG. 8, the device ID of the image forming apparatus 10N (device N) is displayed.

Note that the display processing unit 32 may also cause the display to display the size option 102 and the color option 104 separately. For example, when the user selects the warning mark 64, the display processing unit 32 causes the display to display the size option 102. When the user selects the warning mark 82, the display processing unit 32 may cause the display to display the color option 104.

In the example illustrated in FIG. 8, a combination of processes selected for the printing conditions is executed. For example, in the case where the user has selected the option 102A from the size option 102 and the option 104A from the color option 104, the conversion processing unit 34 reduces the print size of images represented by image data for A3 pages to the size corresponding to an A4 size. Then, the image forming unit 14 prints images for all the pages of "document CCC" on A4-size recording sheets in black and white.

In addition, in the case where the user has selected the option 102A from the size option 102 and the option 104B from the color option 104, the conversion processing unit 34 reduces the print size of images represented by image data for A3 pages to the size corresponding to an A4 size. Then, the image forming unit 14 prints only images for black-and-white pages, on A4-size recording sheets.

In addition, in the case where the user has selected the option 102B from the size option 102 and the option 104A from the color option 104, the image forming unit 14 prints only images for A4 pages, on A4-size recording sheets in black and white.

In addition, in the case where the user has selected the option 102B from the size option 102 and the option 104B from the color option 104, the image forming unit 14 prints only images for A4 and black-and-white pages, on A4-size recording sheets.

As described above, an alternative process is selected for each print condition by the user and a process corresponding to a combination of selected alternative processes is executed.

Note that in the case where the image data of "document BBB" or the warning mark 62 has been specified by the user, the options 68 and 72 illustrated in FIG. 5 are displayed. This is because the image data of "document BBB" does not include image data for a page (an A4 page) that may be printed by the image forming apparatus 10P (the subject apparatus). In addition, in the case where the image data of "document AAA" or the warning mark 80 has been specified by the user, the options 86 and 90 illustrated in FIG. 7 are displayed. This is because the image data of "document AAA" does not include image data for a page (a black-and-white page) that may be printed by the image forming apparatus 10P (the subject apparatus).

Figure 9:
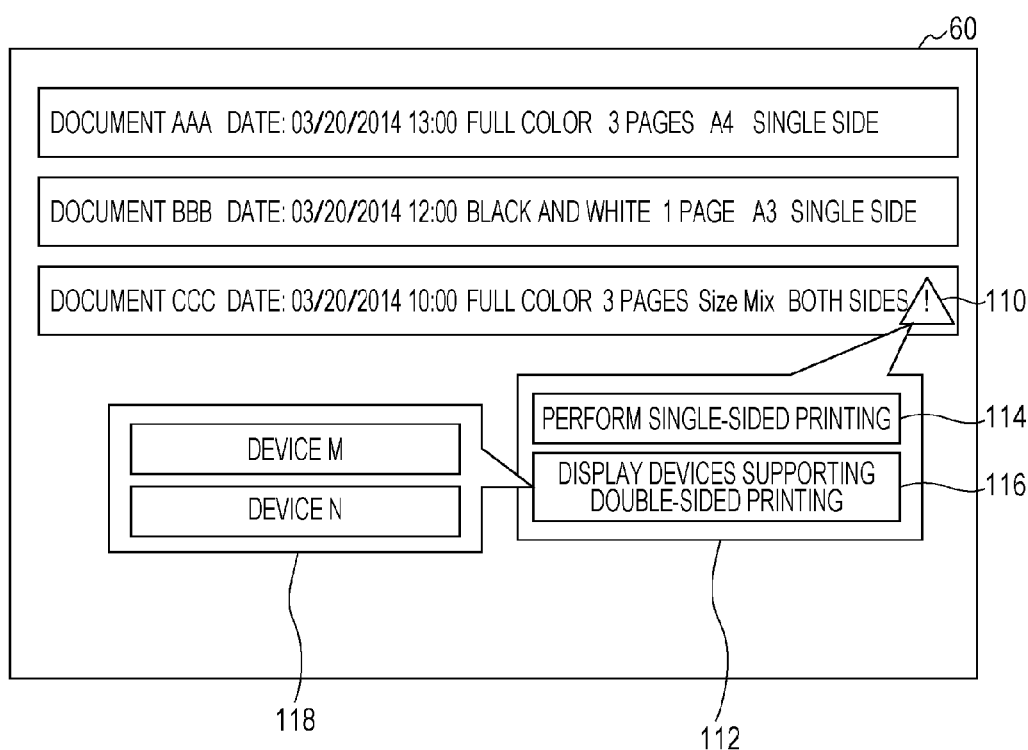
FIG. 9 is a diagram illustrating an example of a screen of the display.

Next, another example will be described with reference to FIG. 9. FIG. 9 illustrates an example of display of associated information. For example, in the case where printing is performed using the image forming apparatus 10P, associated information is displayed on the display of the UI unit 22 of the image forming apparatus 10P. Similarly to as in the example illustrated in FIG. 5, a list of image data IDs (documents AAA, BBB, and CCC) is displayed on the screen 60 of the display.

In addition, for each image data, printing conditions (a color printing condition, a size condition, and a layout condition) are displayed. For each image data, the color printing condition, the size condition, and the number of pages are the same as those illustrated in FIG. 5.

In the example illustrated in FIG. 9, a layout condition is also specified as a printing condition. For example, single-sided printing is specified as a layout condition for the image data of "document AAA" and that of the image data of "document BBB". Double-sided printing is specified as a layout condition for the image data of "document CCC".

Note that, in the example illustrated in FIG. 9, the image forming apparatus 10P is equipped with the A3-size printing function, the full-color printing function, and the single-sided printing function.

A warning mark 110 is displayed on the screen 60. The warning mark 110 is created by the display processing unit 32 of the image forming apparatus 10P and displayed on the display. The warning mark 110 is a mark for the image data of "document CCC". The warning mark 110 is displayed near a display position of information indicating a layout condition (both sides). This indicates that the image forming unit 14 of the subject apparatus is not equipped with the double-sided printing function.

When the user specifies image data for which a warning mark is displayed or the warning mark using the operation unit of the UI unit 22, the display processing unit 32 causes the display to display option information. In the example illustrated in FIG. 9, the image data of "document CCC" or the warning mark 110 is specified, and an option field 112 for the image data of "document CCC" is displayed on the display. In the option field 112, options 114 and 116 are displayed as option information. Since the image forming unit 14 of the subject apparatus is not equipped with a function to perform printing under a specified layout condition, options regarding layout conditions are displayed.

The option 114 is an option for issuing a command to perform single-sided printing. When the process for the option 114 is executed, the image forming unit 14 of the image forming apparatus 10P prints images for pages for which double-sided printing has been specified, on single sides of recording sheets. That is, when the process for the option 114 is executed, images represented by the image data for all the pages are printed on single sides of recording sheets.

The option 116 is an option for issuing a command to perform a process in which information on other image forming apparatuses 10 equipped with the double-sided printing function is displayed. In the exemplary embodiment, the device selection unit 38 of the image forming apparatus 10p selects other image forming apparatuses 10 equipped with the double-sided printing function with reference to the device list 20. Here, the image forming apparatuses 10M and 10N are selected. When the user selects the option 116, the display processing unit 32 causes the display to display a list 118 of device IDs of the image forming apparatuses 10 selected by the device selection unit 38. In the example illustrated in FIG. 9, the device IDs of the image forming apparatuses 10M and 10N (device M and device N) are displayed.

As described above, in the case where printing is not realized under a specified layout condition through the printing function of the subject apparatus, option information indicating alternative processes is displayed.

Note that, as in the example illustrated in FIG. 8, for each of the printing conditions (size conditions, color printing conditions, and layout conditions), a warning mark may be displayed. For each printing condition, options may also be displayed.

In addition, in the case where sheets only one side of each of which is blank are used as recording sheets, when double-sided printing is specified as a printing condition, a warning mark and the option field 112 may also be displayed. The controller 26 determines whether or not recording sheets to be used are sheets only one side of each of which is blank in accordance with information on recording sheets stored in the memory 18 (information as to whether or not recording sheets are sheets only one side of each of which is blank). In the case where recording sheets to be used are sheets only one side of each of which is blank, the display processing unit 32 causes the display to display a warning mark and the option field 112. Even when the image forming unit 14 is equipped with the double-sided printing function, in the case where sheets only one side of each of which is blank are to be used as recording sheets, a warning mark and the option field 112 are displayed.

Figures 10, 11:
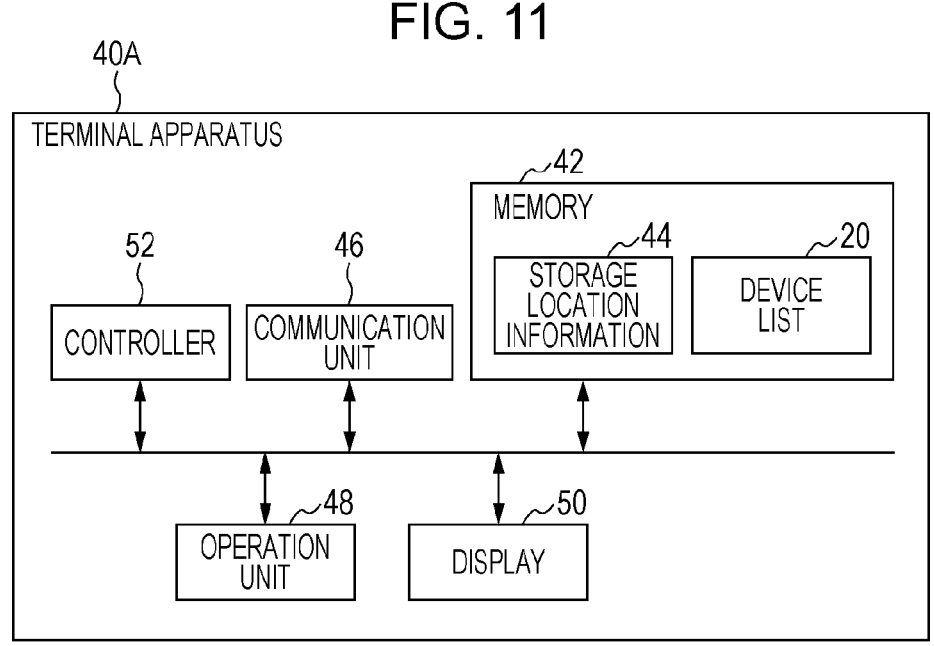
FIG. 10 is a diagram illustrating correspondences between printing functions of image forming apparatuses and printing conditions.
FIG. 11 is a block diagram illustrating a terminal apparatus according to a first modified example.

FIG. 10 illustrates correspondences between the printing functions of the image forming apparatuses 10 and printing conditions set for image data in a collective manner. As an example, the printing functions of the image forming apparatuses 10A, 10B, and 10C (functions regarding recording sheet sizes and color printing) are illustrated. The image forming apparatus 10A (device A) is equipped with the A3-size printing function and the full-color printing function. The image forming apparatus 10B (device B) is equipped with the A3-size printing function and the black-and-white printing function. The image forming apparatus 10C (device C) is equipped with the A4-size printing function and the full-color printing function.

As printing conditions set for the image data of "document AAA", A3-size recording sheet printing and full-color printing are specified. Printing that satisfies the printing conditions is realized by the image forming apparatus 10A (circle marks illustrated in FIG. 10). Full-color printing is not realized by the image forming apparatus 10B, and A3-size recording sheet printing is not realized by the image forming apparatus 10C. In this case, warning marks are displayed for the image forming apparatuses 10B and 10C and furthermore options corresponding to the printing conditions that are not realized are displayed.

As printing conditions set for the image data of "document BBB", A3-size recording sheet printing and black-and-white printing are specified. Printing that satisfies the printing conditions is realized by the image forming apparatuses 10A and 10B. A3-size recording sheet printing is not realized by the image forming apparatus 10C. In this case, a warning mark is displayed for the image forming apparatus 10C and furthermore options corresponding to the printing condition that is not realized are displayed.

As printing conditions set for the image data of "document CCC", A4-size recording sheet printing and full-color printing are specified. Printing that satisfies the printing conditions is realized by the image forming apparatuses 10A and 10C. Full-color printing is not realized by the image forming apparatus 10B. In this case, a warning mark is displayed for the image forming apparatus 10B and furthermore options corresponding to the printing condition that is not realized are displayed.

As printing conditions set for image data of "document DDD", A4-size recording sheet printing and black-and-white printing are specified. In this case, printing that satisfies the printing conditions is realized by the image forming apparatuses 10A, 10B, and 10C. In this case, a warning mark and options are not displayed for any of the image forming apparatuses 10A, 10B, and 10C.

As described above, warning marks and options corresponding to printing conditions that are not realized are displayed for the image forming apparatuses 10 that are not equipped with a function to perform printing under specified printing conditions.

Note that, in the exemplary embodiment described above, the acquisition unit 28 acquires associated information and thereafter acquires image data selected by the user. As another example different from this one, the acquisition unit 28 may acquire image data without acquiring associated information prior to the acquisition of the image data. In this case, the display processing unit 32 causes the display of the UI unit 22 to display associated information on the acquired image data. When the user selects image data, the image forming unit 14 forms images corresponding to the selected image data on sheets. Note that the amount of the image data itself is generally larger than the amount of data of associated information.

First Modified Example

Next, a first modified example will be described. FIG. 11 illustrates the configuration of a terminal apparatus 40A according to the first modified example. The terminal apparatus 40A is connected to the communication path N illustrated in FIG. 1. In the first modified example, device IDs of image forming apparatuses 10 equipped with a function to perform printing under specified printing conditions are displayed on the display 50 of the terminal apparatus 40A.

In the first modified example, the device list 20 is stored in the memory 42. Similarly to as in the example illustrated in FIG. 4, the device list 20 includes device IDs of the image forming apparatuses 10A to 10P and printing function information indicating printing functions of the image forming apparatuses 10A to 10P.

In the first modified example, the controller 52 is equipped with a function similar to that of the device selection unit 38 illustrated in FIG. 2. That is, the controller 52 refers to printing conditions set for image data, which is a print target, and the device list 20, and selects image forming apparatuses 10 equipped with a function to perform printing under the printing conditions. Then, the controller 52 causes the display 50 to display the device IDs of the selected image forming apparatuses 10. Note that the image data, which is a print target, and the printing conditions are, for example, specified by the user using the operation unit 48.

Here, a specific example of the first modified example will be described with reference to FIG. 10. As described above, images represented by the image data of "document AAA" are printed using the image forming apparatus 10A under specified printing conditions. Images represented by the image data of "document BBB" are printed using the image forming apparatus 10A or 10B under specified printing conditions. Images represented by the image data of "document CCC" are printed using the image forming apparatus 10A or 10C under specified printing conditions. Images represented by the image data of "document DDD" are printed using the image forming apparatus 10A, 10B, or 10C under specified printing conditions.

Figure 12:
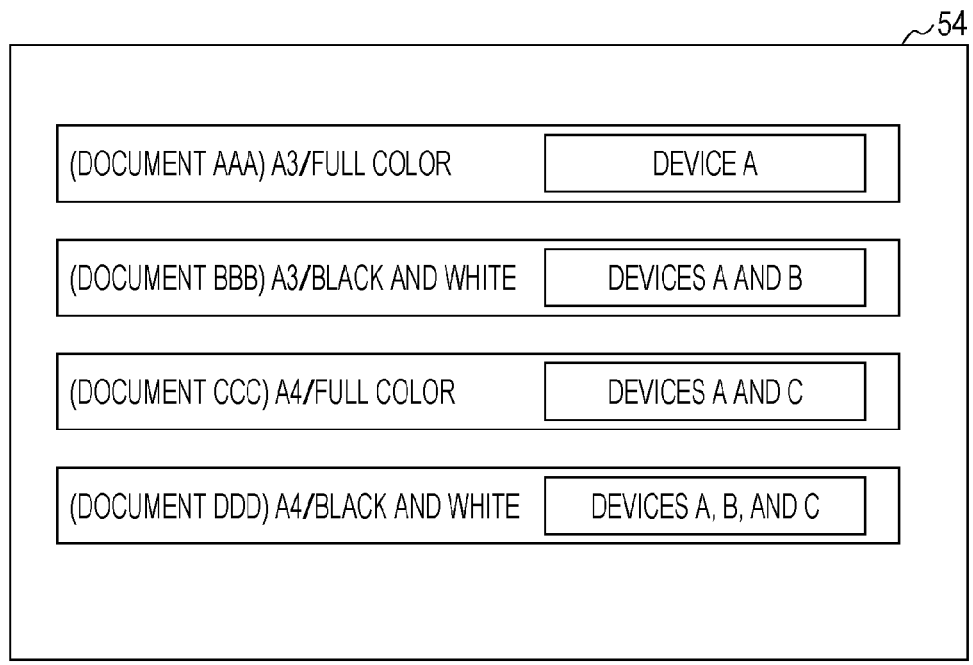
FIG. 12 is a diagram illustrating an example of a screen of a display of the terminal apparatus.

The device IDs of image forming apparatuses 10 equipped with a function to perform printing under specified printing conditions are displayed on an image-data-by-image-data basis on the display 50. FIG. 12 illustrates an example of such display. For each image data, a data ID, printing conditions, and a device ID of an image forming apparatus 10 (device IDs of image forming apparatuses 10) equipped with a function to perform printing under the printing conditions are displayed on a screen 54 of the display 50. For example, for the image data of "document AAA", the device ID of the image forming apparatus 10A (device A) is displayed. The same applies to other image data.

As described above, in the first modified example, the device IDs of image forming apparatuses 10 equipped with a function to perform printing under specified printing conditions are displayed on the terminal apparatus 40A. For example, it is conceivable that the user performs printing using one of the image forming apparatuses 10. For example, in the case where the images represented by the image data of "document AAA" are printed, it is conceivable that the image forming apparatus 10A is used. In this case, the images represented by the image data of "document AAA" are printed by the image forming apparatus 10A under certain printing conditions. The same applies to other image data.

Note that, when the user inputs a command to transmit print data using the operation unit 48, the communication unit 46 may transmit print data to a certain image forming apparatus 10 selected by the controller 52, under control of the controller 52. For example, when a command to transmit the image data of "document AAA" is input by the user, the communication unit 46 transmits print data including the image data to the image forming apparatus 10A. The same applies to other image data. As a result, the acquisition unit 28 of the image forming apparatus 10A does not have to perform a print-data acquisition process. When the user uses the image forming apparatus 10A, the print data has already been stored in the image forming apparatus 10A. As a matter of course, similarly to as in the above-described embodiment, the communication unit 46 may also transmit print data to a certain image forming apparatus 10 indicated by the storage location information 44.

Note that, the image forming apparatus 10 that has received print data from the terminal apparatus 40 may select a certain image forming apparatus 10 equipped with a function to perform printing under specified printing conditions, and may transmit a device ID of the selected image forming apparatus 10 to the terminal apparatus 40. In this case, the device list 20 does not have to be stored in the terminal apparatus 40.

Second Modified Example

Figure 13:
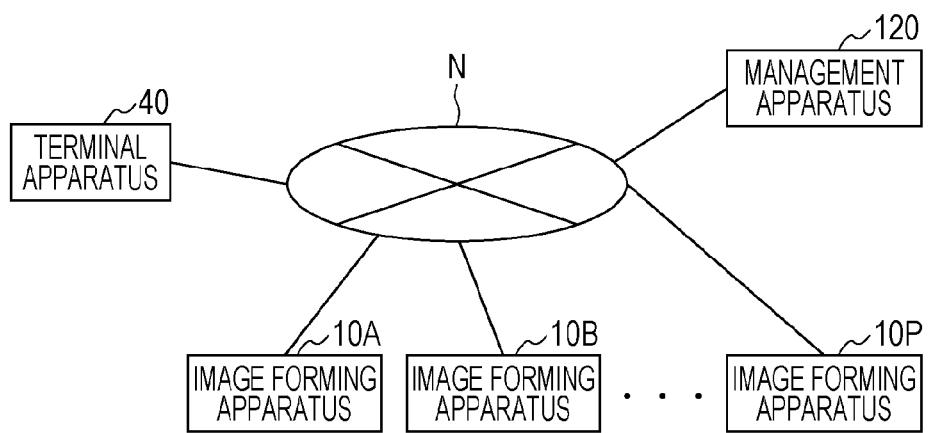
FIG. 13 is a block diagram illustrating an image forming system according to a second modified example.

Next, a second modified example will be described. FIG. 13 illustrates the configuration of an image forming system according to the second modified example. In the second modified example, a management apparatus 120 is connected to the communication path N. The management apparatus 120 is an apparatus for managing image forming apparatuses 10 and is, for example, a print server. For example, upon receiving a request to acquire print data from a certain image forming apparatus 10, the management apparatus 120 transmits the print data to the certain image forming apparatus 10.

Figure 14:
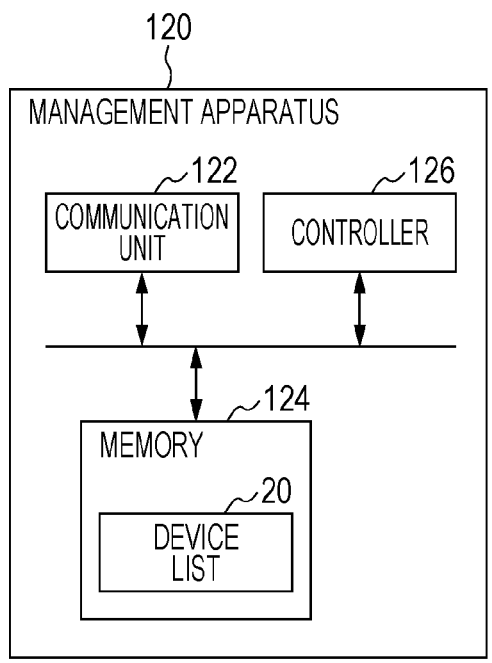
FIG. 14 is a block diagram illustrating a management apparatus.

FIG. 14 illustrates the configuration of the management apparatus 120. A communication unit 122 is a communication interface connected to the communication path N. The communication unit 122 is equipped with a function to receive data from other apparatuses and a function to transmit data to other apparatuses. For example, the communication unit 122 is equipped with a function to receive print data from the terminal apparatus 40 and a function to transmit print data to an image forming apparatus 10.

A memory 124 is a storage device such as a hard disk or the like. For example, print data transmitted from the terminal apparatus 40 is stored in the memory 124. In addition, the device list 20 is stored in the memory 124. Similarly to as in the example illustrated in FIG. 4, the device list 20 includes device IDs of the image forming apparatuses 10A to 10p and printing function information indicating printing functions of the image forming apparatuses 10A to 10P.

A controller 126 controls operations of units of the management apparatus 120 that includes the controller 126. The controller 126 is equipped with a function similar to that of the device selection unit 38 illustrated in FIG. 2. That is, the controller 126 refers to printing conditions set for image data, which is a print target, and the device list 20, and selects image forming apparatuses 10 equipped with a function to perform printing under the printing conditions. Then, the communication unit 122 transmits device IDs of the image forming apparatuses 10 selected by the controller 126 to the terminal apparatus 40. As a result, the device IDs of the selected image forming apparatuses 10 are displayed on the display 50 of the terminal apparatus 40.

As described above, even in the second modified example, the device IDs of image forming apparatuses 10 equipped with a function to perform printing under specified printing conditions are displayed on the terminal apparatus 40.

Note that, in the exemplary embodiment described above, the management apparatus 120 may also include the function determination unit 30, the display processing unit 32, the conversion processing unit 34, the page selection unit 36, and the device selection unit 38. In this case, it is determined by the management apparatus 120 whether or not a certain image forming apparatus 10 used by the user (a subject apparatus) is equipped with a function to perform printing under specified printing conditions. In addition, a warning mark and option information are displayed on the subject apparatus through processing performed by the management apparatus 120. In addition, the management apparatus 120 executes an image reduction process, selection of pages for which printing is realized by the subject apparatus under certain printing conditions, and selection of other image forming apparatuses 10 equipped with a function to perform printing under certain printing conditions.

As an example, the management apparatus 120 is realized by hardware resources and software, which co-operate with each other. Specifically, the management apparatus 120 includes a processor such as a CPU or the like, which is not illustrated. The processor reads programs stored in a memory device, not illustrated, and executes the programs. As a result, the functions of units of the management apparatus 120 are realized. The programs are stored in the memory device via a recording medium such as a CD, a DVD, or the like, or via a communication path such as a network or the like. Alternatively, the units of the management apparatus 120 may also be realized by hardware resources such as a processor, an electronic circuit, and the like. For the realization, a device such as a memory or the like may also be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image forming unit configured to form an image on a recording medium; and
    a display processing unit configured to cause a display to display a group of options including a first option and a second option in a case where the image forming unit is not equipped with a function to form an image on a recording medium under specified image forming conditions, the first option being an option for issuing a command to form an image on a recording medium in a manner realized through a function of the image forming unit, the second option being an option for issuing a command to display identification information of an alternative apparatus equipped with a function to form an image on a recording medium under the image forming conditions among a plurality of other connected image forming apparatuses,
    wherein in a case where image data includes image data for a realizable page, image forming of which is realized through the function of the image forming unit under the image forming conditions, and image data for a non-realizable page, image forming of which is not realized through the function of the image forming unit under the image forming conditions, the display processing unit forms the image for the realizable page on a recording medium under the image forming conditions and causes the display to display the group of options including the first option, a third option, and the second option, the first option being an option for issuing a command to form the image for the non-realizable page on a recording medium in a manner realized through the function of the image forming unit, the third option being an option for issuing a command to form only the image for the realizable page on a recording medium under the image forming conditions, the second option being an option for issuing a command to display the identification information of the alternative apparatus.

2. The image forming apparatus according to claim 1, wherein
    the image forming conditions include a plurality of individual conditions, and
    the display processing unit causes the display to display, for each of the plurality of individual conditions, the group of options.

3. The image forming apparatus according to claim 2, wherein the display processing unit causes the display to display information indicating the plurality of individual conditions, causes the display to display warning information associated with information indicating an individual condition among the plurality of individual conditions that is not realized through the function of the image forming unit, and causes the display to display the group of options corresponding to the individual condition associated with the warning information in a case where the warning information has been specified.

4. The image forming apparatus according to claim 3, wherein
    the image forming conditions include at least a size condition regarding a size of a recording medium,
    the first option is an option for issuing a command to form the image for the realizable page on a recording medium having a size specified by the image forming conditions and a command to change a size of the image for the non-realizable page and to form a resulting image for the non-realizable page on a recording medium,
    the second option is an option for issuing a command to display the identification information of the alternative apparatus equipped with a function to form an image on a recording medium having a size specified by the image forming conditions, and
    the third option is an option for issuing a command to form only the image for the realizable page on a recording medium having a size specified by the image forming conditions.

5. The image forming apparatus according to claim 3, wherein
    the image forming conditions include at least a color condition regarding a color of an image,
    the first option is an option for issuing a command to form the image for the realizable page and that for the non-realizable page on recording mediums in a manner realized through a color-related function of the image forming unit,
    the second option is an option for issuing a command to display the identification information of the alternative apparatus equipped with a function to form an image on a recording medium under a color-related condition specified in the image forming conditions, and
    the third option is an option for issuing a command to form only the image for the realizable page on a recording medium under the color-related condition specified in the image forming conditions.

6. The image forming apparatus according to claim 3, wherein
    the image forming conditions include at least a double-sided printing condition,
    the first option is an option for issuing a command to form the image for the realizable page and that for the non-realizable page on single sides of recording mediums,
    the second option is an option for issuing a command to display the identification information of the alternative apparatus equipped with a function to form images on both sides of a recording medium, and
    the third option is an option for issuing a command to form only the image for the realizable page on a single side of a recording medium.

7. The image forming apparatus according to claim 2, wherein
the image forming conditions include at least a size condition regarding a size of a recording medium,
the first option is an option for issuing a command to form the image for the realizable page on a recording medium having a size specified by the image forming conditions and a command to change a size of the image for the non-realizable page and to form a resulting image for the non-realizable page on a recording medium,
the second option is an option for issuing a command to display the identification information of the alternative apparatus equipped with a function to form an image on a recording medium having a size specified by the image forming conditions, and
the third option is an option for issuing a command to form only the image for the realizable page on a recording medium having a size specified by the image forming conditions.

8. The image forming apparatus according to claim 2, wherein
the image forming conditions include at least a color condition regarding a color of an image,
the first option is an option for issuing a command to form the image for the realizable page and that for the non-realizable page on recording mediums in a manner realized through a color-related function of the image forming unit,
the second option is an option for issuing a command to display the identification information of the alternative apparatus equipped with a function to form an image on a recording medium under a color-related condition specified in the image forming conditions, and
the third option is an option for issuing a command to form only the image for the realizable page on a recording medium under the color-related condition specified in the image forming conditions.

9. The image forming apparatus according to claim 2, wherein
the image forming conditions include at least a double-sided printing condition,
the first option is an option for issuing a command to form the image for the realizable page and that for the non-realizable page on single sides of recording mediums,
the second option is an option for issuing a command to display the identification information of the alternative apparatus equipped with a function to form images on both sides of a recording medium, and
the third option is an option for issuing a command to form only the image for the realizable page on a single side of a recording medium.

10. The image forming apparatus according to claim 1, wherein
the image forming conditions include at least a size condition regarding a size of a recording medium,
the first option is an option for issuing a command to form the image for the realizable page on a recording medium having a size specified by the image forming conditions and a command to change a size of the image for the non-realizable page and to form a resulting image for the non-realizable page on a recording medium,
the second option is an option for issuing a command to display the identification information of the alternative apparatus equipped with a function to form an image on a recording medium having a size specified by the image forming conditions, and
the third option is an option for issuing a command to form only the image for the realizable page on a recording medium having a size specified by the image forming conditions.

11. The image forming apparatus according to claim 2, wherein
the image forming conditions include at least a color condition regarding a color of an image,
the first option is an option for issuing a command to form the image for the realizable page and that for the non-realizable page on recording mediums in a manner realized through a color-related function of the image forming unit,
the second option is an option for issuing a command to display the identification information of the alternative apparatus equipped with a function to form an image on a recording medium under a color-related condition specified in the image forming conditions, and
the third option is an option for issuing a command to form only the image for the realizable page on a recording medium under the color-related condition specified in the image forming conditions.

12. The image forming apparatus according to claim 1, wherein
the image forming conditions include at least a double-sided printing condition,
the first option is an option for issuing a command to form the image for the realizable page and that for the non-realizable page on single sides of recording mediums,
the second option is an option for issuing a command to display the identification information of the alternative apparatus equipped with a function to form images on both sides of a recording medium, and
the third option is an option for issuing a command to form only the image for the realizable page on a single side of a recording medium.

13. An image forming method comprising:
forming an image on a recording medium using an image forming unit; and
causing, by a display processing unit, a display to display a group of options including a first option and a second option in a case where the image forming unit is not equipped with a function to form an image on a recording medium under specified image forming conditions, the first option being an option for issuing a command to form an image on a recording medium in a manner realized through a function of the image forming unit, the second option being an option for issuing a command to display identification information of an alternative apparatus equipped with a function to form an image on a recording medium under the image forming conditions among a plurality of other connected image forming apparatuses,
wherein in a case where image data includes image data for a realizable page, image forming of which is realized through the function of the image forming unit under the image forming conditions, and image data for a non-realizable, image forming of which is not realized through the function of the image forming unit under the image forming conditions, the display processing unit forms the image for the realizable page on a recording medium under the image forming conditions and causes the display to display the group of options including the first option, a third option, and the second option the first option being an option for issuing a command to form the image for the non-realizable page on a recording medium in a manner realized through the function of the image forming unit, the third option being an option for issuing a command to form only the image for the realizable page on a recording medium under the image forming conditions, the second option being an option for issuing a command to display the identification information of the alternative apparatus.

14. A non-transitory computer readable medium storing a program causing a computer to execute a process, the process comprising:

forming an image on a recording medium using an image forming unit; and causing, by a display processing unit, a display to display a group of options including a first option and a second option in a case where the image forming unit is not equipped with a function to form an image on a recording medium under specified image forming conditions, the first option being an option for issuing a command to form an image on a recording medium in a manner realized through a function of the image forming unit, the second option being an option for issuing a command to display identification information of an alternative apparatus equipped with a function to form an image on a recording medium under the image forming conditions among a plurality of other connected image forming apparatuses, wherein in a case where image data includes image data for a realizable page, image forming of which is realized through the function of the image forming unit under the image forming conditions, and image data for a non-realizable page, image forming of which is not realized through the function of the image forming unit under the image forming conditions, the display processing unit forms the image for the realizable page on a recording medium under the image forming conditions and causes the display to display the group of options including the first option, a third option, and the second option, the first option being an option for issuing a command to form the image for the non-realizable page on a recording medium in a manner realized through the function of the image forming unit, the third option being an option for issuing a command to form only the image for the realizable page on a recording medium under the image forming conditions, the second option being an option for issuing a command to display the identification information of the alternative apparatus.

* * * * *